Patented Apr. 10, 1928.

1,665,694

UNITED STATES PATENT OFFICE.

ELBERT E. FISHER, OF TOLEDO, OHIO, ASSIGNOR OF ONE-HALF TO GEORGE W. BATCHELL, OF TOLEDO, OHIO.

GLASS AND ITS MANUFACTURE.

No Drawing. Application filed April 6, 1927. Serial No. 181,613.

My present invention relates to glass and batches for use in glass manufacture and processes of producing glass in which barium sulfide is used as one of the essential materials or ingredients of the batch and by the use of barium sulfide for this purpose and as hereinafter more particularly described and claimed, I have attained advantages not only of economy in the manufacture of barium glasses but also have facilitated the production of glass of especially desirable plasticity or workability and of low solubility and also having good hardness so that it is well adapted for use in the production of plate and window glass, pressed and hollow ware, such for example as bottles and tableware and in general all machine and hand-blown ware.

In my copending application for United States patent, Serial No. 181,274, filed April 5, 1927, I have described and claimed a method of glass manufacture, a batch for use in such method and the glass produced, in which barium sulfate is used as one of the batch ingredients. While the use of barium sulfate as described in my copending United States patent application, Serial No. 181,274 involves important practical advantages in processes of glass manufacture as therein described and in the properties of the glass which is produced, I have also made the further discovery that by the use of barium sulfide as hereinafter described certain additional advantages are obtained, together also with certain similar advantages which result in greater degree from the use of barium sulfide than when barium sulfate is used as described in my copending application hereinbefore mentioned.

From practical tests and experimentation in the manufacture of glass of the character to which my invention relates and in which barium sulfate is used as a batch ingredient without the employment of carbonaceous or other reducing agents, I have ascertained that approximately one-twenty-fifth as much barium sulfate as the silica present is apparently the practical maximum quantity of barium sulfate which ordinarily can be used with full satisfaction in glass batches of such character as I have described in my copending application hereinbefore mentioned, for the reason that if a materially larger proportion than this of barium sulfate is used in such batches (without carbonaceous or other equivalent reducing agents) the objectionable feature is encountered that a supernatant layer of molten sulfate material (usually termed "salt water" in glass factory parlance) is formed upon the surface of the molten glass when the glass batch is melted. In the use of barium sulfide, according to my present invention, still larger quantities of barium may be introduced into the batch so as to impart predetermined desirable characteristics to the glass produced without causing objectionable formation of "salt water" on the batch when it is melted. By thus facilitating the employment of larger quantities of barium as a batch ingredient, the use of barium sulfide permits the practical and economical manufacture of glass in the production of which an even lower melting temperature may be employed than in the case of otherwise similar glasses which may be formed with the use of barium sulfate and also the use of barium sulfide according to my present invention permits the practical manufacture of glasses which are even more readily and satisfactorily worked by molding, blowing, drawing, pressing, or other usual glass-shaping operations and which may have even greater brilliance than glasses of otherwise like character formed with barium sulfate in the proportions in which I have found it ordinarily most practical and expedient to use it.

While my invention is not, as a matter of fact, limited and I do not wish to be understood as limiting it to any particular specific formula of associated batch ingredients for making glass, the following comparative formulæ are given as exemplifying the employment of my invention as it may, with the hereinbefore specified and other advantages, be employed in the improvement of glass manufacture as heretofore practiced:

*Typical glass batch formula as used before my invention for making glass for bottles and jars:*

| | |
|---|---|
| Sand | 100 lbs. |
| Feldspar | 2 lbs. |
| Soda ash | 48 lbs. |
| Salt cake | 1 lb. |
| Limestone | 16 lbs. |
| Arsenious oxide | 1 oz. |

*Improved formula of batch for making glass for bottles or jars according to my invention:*

| | |
|---|---|
| Sand | 100 lbs. |
| Barium sulfide | 4 lbs. |
| Soda ash | 35 lbs. |
| Limestone | 18 lbs. |
| (With or without) arsenious oxide | 1 oz. |

*Typical window glass batch formula as heretofore used:*

| | |
|---|---|
| Sand | 100 lbs. |
| Soda ash | 28 lbs. |
| Salt cake | 8 lbs. |
| Limestone | 28 lbs. |
| Arsenious oxide | 1 oz. |

*Window glass batch formula prepared according to my present invention:*

| | |
|---|---|
| Sand | 100 lbs. |
| Soda ash | 24 lbs. |
| Barium sulfide | 10 lbs. |
| Limestone | 26 lbs. |
| (With or without) arsenious oxide | 1 oz. |

In the use of barium sulfide, according to my present invention, I am enabled to dispense with a portion of the soda ash which otherwise would be required or ordinarily used in making glass for similar purposes and at the same time produce a glass of improved qualities and at a reduced cost of production, not only as regards the initial cost of the batch ingredients in the aggregate (at usual normal prices of the substances used) but also as regards the cost of melting and refining the glass because of the lower temperatures required for melting and refining due to the employment of barium sulfide.

In the practical employment of my invention, the barium sulfide used need not be a strictly pure or highly purified product, but may be (particularly for considerations of economy) a more or less crude product, such as is obtainable (by heretofore well-known procedure) by heating barium sulfate with coal or other suitable carbonaceous material, for example in a suitable furnace using a reducing flame of oil or coal as fuel. A product thus produced (and which is of a character or type which is sometimes referred to in common parlance as a "black ash") will ordinarily consist mainly of barium sulfide, but the presence of some residual barium sulfate or of small quantities of incidental impurities or associated substances, among which may be small quantities of barium carbonate or oxide will not preclude the employment of the product thus formed for the purposes of my invention. However, I preferably employ a barium sulfide which does not contain more than about ten (10%) per cent of impurities, and the presence of barium carbonate (because of a higher temperature which it requires for its utilization by chemical recombination in a glass-forming batch when the batch is melted, as compared with the temperatures required for either barium sulfate or barium sulfide in otherwise similar batches) is, from a standpoint of maximum economy, disadvantageous and should therefore ordinarily be avoided so far as it is convenient and economical to restrict the formation and presence of the carbonate associated with the sulfide. The presence of some barium sulfate associated with the barium sulfide is not correspondingly disadvantageous but may, in fact, in some instances, be of direct advantage for the reason that barium sulfate possesses the desirable property of preventing or lessening the tendency to scum formation on the glass batch when melted. When in the formulæ hereinbefore given, exemplifying my invention, and when, in the claims, I refer to "barium sulfide", I mean to include and do include either barium sulfide in a pure or substantially pure form or a more or less crude or impure product such as that hereinbefore referred to and my invention contemplates and embraces the use of barium sulfide whether it be supplied in the glass batch either in a relatively pure form or in a more or less crude form, such as when obtained by the method, hereinbefore just mentioned, of reducing ordinary commercial barium sulfate or barytes with coal or other suitable carbonaceous material.

By employing batches in accord with my present invention and which are substantially free from any quantities of carbonaceous or other reducing agents which would interfere with the decolorizing action of decolorizing agents such as selenium or its compounds, for example sodium selenite or barium selenide, or manganese dioxide, I am enabled to employ such decolorizing agents for satisfactory partial or complete decolorization of the glass produced.

When in the claims I specify "a substantial proportion," I do not mean to restrict myself to the particular proportions set forth in the formulæ which I have given exemplifying my invention, but mean such a quantity as will produce a material effect in determining and fixing the characteristics of the glass which is formed and preferably such a quantity as will, by its presence and use, result in material advantages as regards facilitating the process of production and the character of the product formed, such as I have hereinbefore described.

When in the claims barium sulfide is referred to as a "primary ingredient" of the glass-forming batch, this is intended to mean and does mean that barium sulfide is used as one of the initial or original ingredients of the glass-forming batch as prepared prior to the melting of the batch.

Having described my invention, what I claim as new and desire to secure by Letters Patent is:

1. A glass-forming batch containing barium sulfide as a primary ingredient.

2. A glass-forming batch containing barium sulfide as a primary ingredient and which when melted is capable of forming a clear transparent glass.

3. A glass-forming batch capable, when melted, of being effectively decolorized by selenium and containing barium sulfide as a primary ingredient of the batch.

4. A glass-forming batch containing a substantial proportion of barium sulfide as a primary ingredient.

5. A glass-forming batch containing a substantial proportion of barium sulfide as a primary ingredient and which when melted is capable of forming a clear transparent glass.

6. The method of producing glass which comprises melting a glass-forming batch containing barium sulfide as a primary ingredient.

7. The method of producing glass which comprises melting a glass-forming batch containing barium sulfide as a primary ingredient and which batch when melted is capable of forming a clear transparent glass.

8. The method of producing glass which comprises melting a glass-forming batch capable, when melted, of being effectively decolorized by selenium, and containing barium sulfide as a primary ingredient.

9. The method of producing glass which comprises melting a glass-forming batch containing a substantial proportion of barium sulfide as a primary ingredient and which batch when melted is capable of forming a clear transparent glass.

10. The method of producing glass which comprises melting a glass-forming batch capable, when melted, of being effectively decolorized by selenium, and containing a substantial proportion of barium sulfide as a primary ingredient.

11. A glass-forming batch containing barium sulfide as a primary ingredient and containing also silica and glass-forming compounds of sodium and calcium.

12. A glass-forming batch containing barium sulfide as a primary ingredient and containing also silica and glass-forming compounds of sodium and calcium, said batch being capable, when melted, of being effectively decolorized by selenium.

13. The method of producing glass which comprises melting a glass-forming batch containing barium sulfide as a primary ingredient and containing also silica and glass-forming compounds of sodium and calcium, said batch being capable, when melted, of being effectively decolorized by the action of selenium and possessing the property of solidifying in the form of substantially clear and transparent glass.

14. A glass formed from a batch containing barium sulfide as a primary ingredient.

15. A batch for glass production, comprising as essential primary ingredients barium sulfide, silica and glass-forming compounds of sodium and calcium, said batch, when melted, forming a glass capable of being effectively decolorized by selenium and which solidifies to a clear transparent product.

16. A batch for glass production comprising silica, sodium carbonate, and calcium carbonate, together with barium sulfide, as primary ingredients, and producing, when melted, a glass which is capable of being effectively decolorized by selenium and which solidifies to a clear transparent product.

17. A glass-forming batch containing as a primary ingredient a "black ash" of which barium sulfide is a principal constituent.

18. A glass-forming batch containing as a primary ingredient a "black ash" of which barium sulfide is a principal constituent and which batch when melted is capable of forming a clear, transparent glass.

19. A glass-forming batch containing as a primary ingredient a substantial proportion of a "black ash" of which barium sulfide is a principal constituent.

20. A glass-forming batch containing as a primary ingredient a substantial proportion of a "black ash" of which barium sulfide is a principal constituent and which batch, when melted, is capable of forming a clear, transparent glass.

21. A method of producing glass, which comprises melting a glass-forming batch containing as a primary ingredient a "black ash" of which barium sulfide is a principal constituent.

22. A method of producing glass, which comprises melting a glass-forming batch containing as a primary ingredient a substantial proportion of a "black ash" of which barium sulfide is a principal constituent.

23. A glass formed by melting a glass-forming batch capable, when melted, of being effectively decolorized by selenium, and containing a substantial proportion of barium sulfide as a primary ingredient.

24. A glass formed by melting a glass-forming batch containing barium sulfide as a primary ingredient and containing also silica and glass-forming compounds of sodium and calcium, said batch being capable, when melted, of being effectively decolorized by the action of selenium and possessing the property of solidifying in the form of substantially clear and transparent glass.

25. A glass formed by melting a glass-forming batch containing barium sulfide as a primary ingredient and containing also silica, sodium carbonate and calcium carbonate, said batch being capable, when melted, of being effectively decolorized by the action of selenium and possessing the property of solidifying in the form of substantially clear and transparent glass.

In witness whereof, I have hereunto signed my name to this specification on the 5th day of April, 1927.

ELBERT E. FISHER.